US012091760B2

(12) United States Patent
Nwamba

(10) Patent No.: US 12,091,760 B2
(45) Date of Patent: Sep. 17, 2024

(54) MODIFIED GRAPHITE SUBSTRATES WITH IMPROVED STABILITY

(71) Applicant: Okechukwu Charles Nwamba, Lakewood, CO (US)

(72) Inventor: Okechukwu Charles Nwamba, Lakewood, CO (US)

(73) Assignee: Okechukwu Charles Muamba, Lakewood, CO (US)

(*) Notice: Subject to any disclaimer, the term of this patent is extended or adjusted under 35 U.S.C. 154(b) by 0 days.

(21) Appl. No.: 16/938,695

(22) Filed: Jul. 24, 2020

(65) Prior Publication Data

US 2021/0140059 A1 May 13, 2021

Related U.S. Application Data

(60) Provisional application No. 62/933,255, filed on Nov. 8, 2019.

(51) Int. Cl.
H01M 4/00 (2006.01)
C25B 11/043 (2021.01)
H01M 4/04 (2006.01)

(52) U.S. Cl.
CPC ......... *C25B 11/043* (2021.01); *H01M 4/0404* (2013.01); *H01M 4/0471* (2013.01)

(58) Field of Classification Search
CPC ..................................................... H01M 4/00
See application file for complete search history.

(56) References Cited

U.S. PATENT DOCUMENTS

| 5,582,811 | A | * | 12/1996 | Greinke | ............... | C04B 35/536 |
| | | | | | | 423/265 |
| 5,866,353 | A | * | 2/1999 | Berneth | ................ | C12Q 1/004 |
| | | | | | | 435/26 |
| 6,339,031 | B1 | * | 1/2002 | Tan | ..................... | C04B 38/0022 |
| | | | | | | 428/315.7 |

FOREIGN PATENT DOCUMENTS

GB        1500675 A  *  2/1978  ............... D01F 9/22

OTHER PUBLICATIONS

"Thermal Modification of Graphite for Fast Electron Transport and Increased Capacitance", O. Charles Nwamba, Elena Echeverria, David N. McIlroy, Aaron Austin, Jeanne M. Shreeve, and D. Eric Aston, ACS Appl. Nano Mater. 2019, 2, 228-240, published (Year: 2018).*

(Continued)

*Primary Examiner* — Kelly M Gambetta
*Assistant Examiner* — Mohammad Mayy

(57) ABSTRACT

A system and method for improving and stabilizing an electronic property of graphite are provided. The method includes heating a graphitic carbon electrode substrate to a first temperature of at least 600° C., maintaining, via controlled heating by the heat source, the graphitic carbon electrode substrate at the first temperature for a first duration of at least 20 minutes, reducing a temperature of the graphitic carbon electrode substrate from the first temperature to a second temperature over a second duration of at least 10 minutes, wherein the second temperature falls within a second range of between 450-500° C., and further reducing the temperature of the graphitic carbon electrode substrate from the second temperature to a third temperature over a third duration of at least 5 minutes, wherein the third temperature falls within a third range of between 180-270° C.

13 Claims, 5 Drawing Sheets

(56) References Cited

OTHER PUBLICATIONS

"Theoretical and experimental study on the interfacial adhesive properties of graphite electrodes in different charging and aging states",Zhansheng Guo, Chao Liu a, Bo Lu, Jiemin Feng, Carbon 150 (2019) 32-42 (Year: 2019).*

"Ultrathin Graphite Foam: A Three-Dimensional Conductive Network for Battery Electrodes", Hengxing Ji, Lili Zhang, Michael T. Pettes, Huifeng Li, Shanshan Chen, Li Shi, Richard Piner, and Rodney S. Ruoff, Nano Lett., 12, 2446-2451, (Year: 2012).*

* cited by examiner

MODIFIED GRAPHITE SUBSTRATES WITH IMPROVED STABILITY

CROSS-REFERENCES TO RELATED APPLICATIONS

This application claims the benefit of and priority under 35 U.S.C. § 119(e) to U.S. Provisional Patent Application Ser. No. 62/933,255 filed Nov. 8, 2019, which is incorporated herein by reference in its entirety.

BACKGROUND

Carbon based electrode materials find application in diverse fields including, but not limited to, sensing, electrochemistry, energy storage, catalysis, energy production, and semiconductor technologies. In applications where carbon based electrode materials come into contact with water and/or chemical or biological materials (e.g., as in electrooxidative wastewater treatment technology), electrode devices including carbon based electrode materials typically require a separation barrier between the electrode material and the reaction environment. The separation barrier addresses fouling and other passivation processes that occur on electrode surfaces while current is flowing and/or due to chemical and biological reactions that occur due simply to exposure of the surface to a liquid containing charged species (e.g., ions, enzymes, proteins, etc.). While many sophisticated barrier materials exist, the interposition of a separation barrier between the electrode material and the reaction environment introduces a barrier to electron conduction that impacts the operation of the electrode. Alternative approaches include introducing metal electrode materials. Metal electrodes similarly include barrier coatings to prevent corrosion, which presents a significant limitation to the sustained use of metals in aqueous or corrosive environments where long-term stability is sought. Conventional material improvement processes that require coatings and/or barrier layers to inhibit fouling result in coincident decreases of electron transfer properties of electrode and sensor materials. Therefore, improvements are desired in the stability and performance of electron transfer in materials used in electrochemical applications.

SUMMARY

Various techniques are described herein for improvement of stability and quality of electronic properties of graphitic carbon materials. The graphitic carbon materials may include, but are not limited to graphite, highly-ordered pyrolytic graphite (HOPG), graphene, artificial graphite, natural graphite, graphite felt, pyrolytic graphite (PG), and the like. Graphitic carbon materials can be enhanced by thermal chemical treatments that elicit nanoscale changes in the graphitic carbon material. The thermal-chemical treatments may include thermal treatment in an ambient air environment, thereby modifying the chemical structure of the graphitic material in such a way that electronic properties in aqueous environments (e.g., peak potential "$E_p$" and corresponding "$\Delta E_p$" values) are improved in terms of stability and/or quality. For example, thermal treatment in air followed by restricted aging in air may result in stable $E_p$ and $\Delta E_p$ values from aqueous cyclic voltammetry over a 64 day period, or longer.

According to various embodiments of the present disclosure, a system for improving and stabilizing an electronic property of graphite is described. The system can include a heat source having a heating cavity and a controller including one or more processors and a memory device provided with computer-executable instructions that, when executed by the one or more processors, configure the controller to heat a graphitic electrode substrate positioned in the heating cavity according to a predefined temperature program. The temperature program can include increasing a heating cavity temperature of the heating cavity to a first temperature of at least 600° C., maintaining the graphitic electrode substrate in the heating cavity at the first temperature for a first duration of at least 20 minutes by controlling a heat flux of the heat source, gradually decreasing the temperature of the heating cavity from the first temperature to a second temperature of between 450 and 500° C. over a second duration of at least 10 minutes by reducing the heat flux of the heat source, and gradually decreasing the temperature of the heating cavity from the second temperature to a third temperature of between 180 and 270° C. by further reducing the heat flux of the heat source over a third duration of at least 5 minutes, so that a treated graphitic carbon electrode substrate is generated having stabilized electronic properties relative to untreated graphitic carbon.

According to various embodiments of the present disclosure, methods for improving and stabilizing an electronic property of graphite are described. The methods can include heating a graphitic carbon electrode substrate in a heating cavity by applying heat within the heating cavity by a heat source according to a predefined temperature program. The temperature program can include increasing a heating cavity temperature of the heating cavity to a first temperature of at least 600° C., maintaining, via controlled heating by the heat source, the graphitic carbon electrode substrate at the first temperature for a first duration of at least 20 minutes, reducing a temperature of the graphitic carbon electrode substrate from the first temperature to a second temperature over a second duration of at least 10 minutes, wherein the second temperature of between 450-500° C., and further reducing the temperature of the graphitic carbon electrode substrate from the second temperature to a third temperature over a third duration of at least 5 minutes, wherein the third temperature of between 180-270° C., so that a treated graphitic carbon electrode substrate is generated having improved electronic properties and stability relative to untreated graphitic carbon.

According to various embodiments of the present disclosure, a graphitic electrode substrate having improved and stabilized electronic properties can be produced by the various systems and methods disclosed herein. For example, according to some embodiments, a graphitic electrode substrate can be produced by heating a graphitic carbon electrode substrate in a heating cavity by applying heat within the heating cavity by a heat source according to a predefined temperature program. The temperature program can include increasing a heating cavity temperature of the heating cavity to a first temperature of at least 600° C., maintaining, via controlled heating by the heat source, the graphitic carbon electrode substrate at the first temperature for a first duration of at least 20 minutes, reducing a temperature of the graphitic carbon electrode substrate from the first temperature to a second temperature over a second duration of at least 10 minutes, wherein the second temperature can be between 450-500° C., and further reducing the temperature of the graphitic carbon electrode substrate from the second temperature to a third temperature over a third duration of at least 5 minutes, wherein the third temperature can be between 180-270° C., so that a treated graphitic carbon electrode substrate is generated. The treated electrode substrate can be integrated with one or more of the structures described in the following paragraphs to form an electrode (e.g., as part of a device such as an electrochemical cell, a sensor device, etc.).

BRIEF DESCRIPTION OF THE DRAWINGS

Various embodiments in accordance with the present disclosure will be described with reference to the drawings, in which.

DETAILED DESCRIPTION

Figure 1:
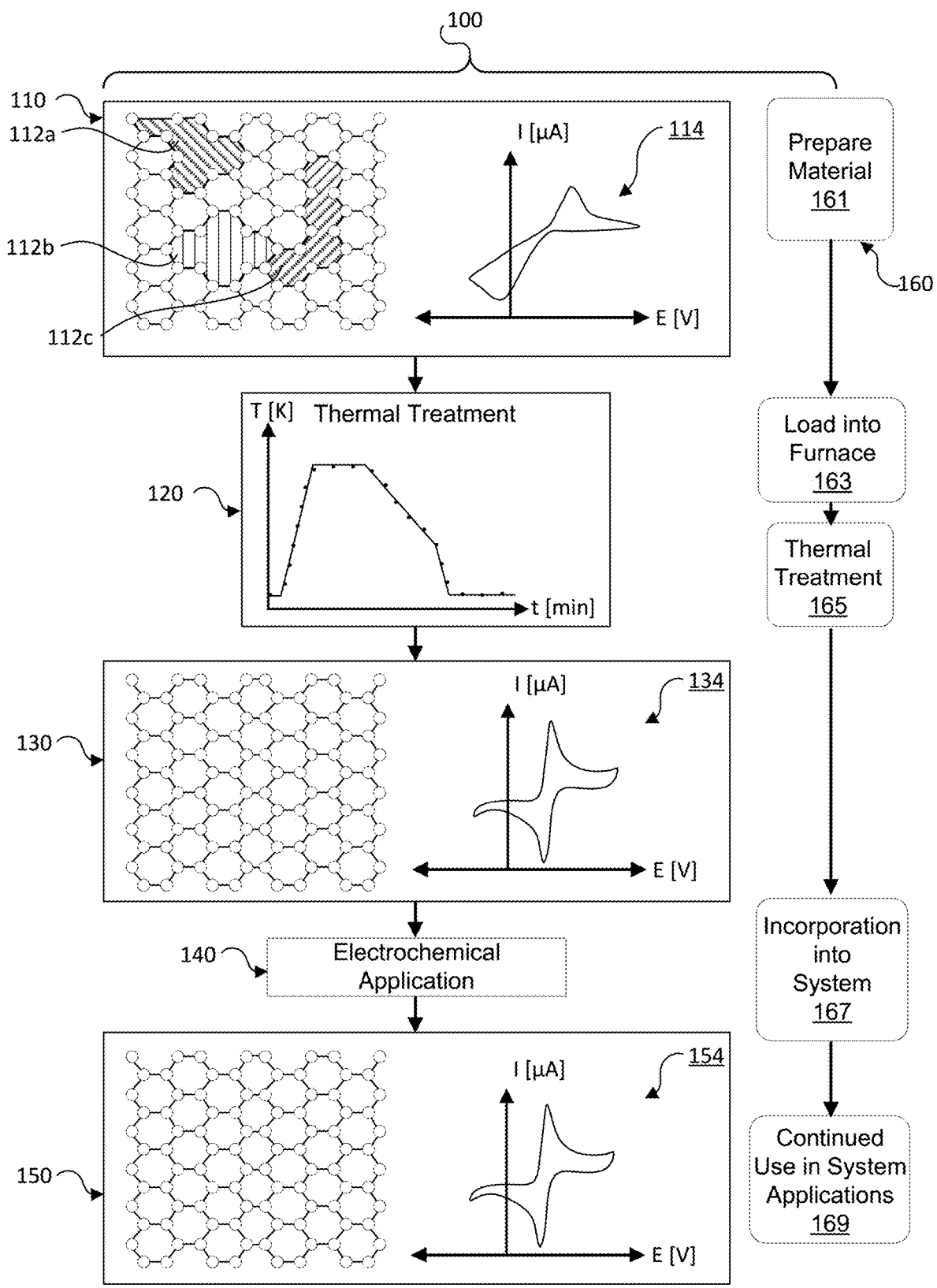
FIG. 1 is a diagram showing an example technique for improving and stabilizing an electronic property of graphite in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced in other configurations, or without the specific details. Furthermore, well-known features may be omitted or simplified in order not to obscure the embodiment being described.

Generally, systems and methods for improving and stabilizing an electronic property of graphite and graphitic carbon are described herein. According to various embodiments, a graphitic carbon substrate can be prepared for thermal treatment, e.g. by mechanical exfoliation of bulk graphite, or other suitable method for generating a graphitic carbon substrate. The graphitic carbon substrate is then subjected to heating according to a schedule, from a first temperature to a second temperature over a period of time. As part of the heating schedule, the heating rate (e.g., in K/s) may be controlled, as can other aspects of the heating schedule including, but not limited to, the temperature overshoot, the heat flux, or the atmosphere around the graphitic carbon substrate. Similarly, the temperature of the graphitic carbon substrate may be reduced in a controlled manner by reducing the heat flux as a function of time from the second temperature to a third temperature. According to some embodiments, the heating and cooling process can be applied to the graphitic carbon substrate via a tubular furnace. For example, in one embodiment, the graphitic carbon substrate is placed in a heating zone of a tubular furnace in atmospheric air and the furnace raises a temperature of the heating zone to a first temperature set point over a period of time that is controlled by a control unit. In this illustrative example, the furnace follows a pre-programmed temperature set point schedule that defines a first heating phase at which the graphitic carbon substrate is maintained at or above 650° C. Upon reaching the first temperature set point, the furnace maintains the temperature of the heating zone for a period of time, such as between 10-100 minutes, according to the set point schedule. Subsequently, the furnace follows a controlled temperature ramp from the first temperature set point to a second temperature set point over a period of time according to the set point schedule. As described below, the second temperature may be in a range between 450°-500° C. In some embodiments, the controlled temperature ramp may include a third temperature, within a third temperature range; between 200-500° C. Finally, the graphitic carbon substrate is removed from the furnace, whereupon the treatment provides improved and stabilized electronic properties in a treated carbon substrate relative to analogous properties in the graphitic carbon substrate prior to thermal treatment.

Carbon substrates modified by application of the thermal chemical processes described above can be incorporated in a device as a conductive surface. To illustrate, consider an example of an electrochemical water treatment system. In this example, one or more of the working electrodes in the system include the treated carbon substrate as a contact surface. The treated carbon substrate, by virtue of the stability imparted by the thermal chemical processes described herein, can be used directly in contact with a liquid being treated in the system (e.g., wastewater or untreated water). The thermal chemical processes described herein also improve and stabilize electronic properties of the treated carbon substrates including electrochemical peak potential ($E_p$) and electrochemical reversibility, characterized by a decreased peak potential differences $\Delta E_p$ which permit the treated carbon substrate to perform the function of cathode and/or anode for a prolonged period of time, including several months, at improved operating efficiencies and without deterioration of operating efficiency (e.g., reaction efficiency, conversion, etc.) due to chemical fouling. The device incorporating the treated carbon substrate of this example does not include additional barrier materials interposed between the treated carbon substrate and the liquid being treated.

Embodiments of the present disclosure provide several advantages over existing electrode materials and systems incorporating them for application in treatment of liquids. For example, treating graphitic carbon substrates by following a thermal-chemical treatment regime as disclosed herein improves the chemical stability and the electronic properties of the carbon substrate, making the carbon substrate perform better as an electrode material and eliminating the need for a protective barrier between the substrate and the liquids. By incorporating the improved carbon substrates as electrodes in diverse devices (e.g., water treatment systems) the devices may operate with improved longevity and performance.

FIG. 1 is a diagram showing an example technique 100 for improving and stabilizing an electronic property of graphite in accordance with an embodiment of the present disclosure. In untreated form, a graphitic carbon material 110 can be characterized by parallel layers of $sp^2$ hybridized carbon held to each other by relatively weak Van der Waals interlayer bonding. Examples of the graphitic carbon material 110 include, but are not limited to, graphite, highly-ordered pyrolytic graphite (HOPG), a graphite rod, a pyrolytic graphite, a graphite felt GFA3, a graphite felt GFA5, a natural graphite, artificial graphite, graphene, or the like. In some cases, one or more defects 112a-c may be present in the graphitic carbon material including but not limited to vacancies, interstitial atoms, dislocations, or the like. In some cases, the defects 112a-c have an effect on one or more electronic properties 114 of the graphitic carbon material causing deviation from a theoretical optimum expected for an ideal material. For example, the electronic properties 114 may include a cyclic voltammetry characterization including a peak potential measurement ($E_p$).

Electrochemical Peak potential ($E_p$) is a characteristic measurement derived from a cyclic voltammogram. The $E_p$ is calculated by measuring the potential at which the current reaches a stationary point in the forward scan of the voltage cycle. The reverse also can be true for the backward scan In physical terms, the $E_p$ describes the voltage at which the current density of the electrochemical cell (e.g., as a source of electrons) is highest in cathodic operation of the electrode (where the electrode receives electrons from the electrochemical medium) and/or anodic operation of the electrode (where the electrode releases electrons into the electrochemical medium). The difference in the cathodic and anodic peak potentials is referred to as the $\Delta E_p$ value. A smaller $\Delta E_p$ value indicates an electrochemical cell that provides higher current density at lower operating voltage. In turn, this indicates potentially improved performance in an electrochemical system where reaction kinetics are proportional to operating current, and high voltage may induce excessive electrolysis of the electrochemical reaction medium.

For example, cyclic voltammetry may be undertaken in a 1 mM ferri-ferrocyanide aqueous solution, applying a voltage scan rate of 0.05 V/s. In the untreated graphitic carbon material 110, a cyclic voltammogram may be characterized by asymmetry in the shape of a forward scan relative to a reverse scan, which may indicate irreversibility in cathodic and anodic properties. Furthermore, the presence of the defects 112a-c may cause the carbon substrate to be susceptible to oxidation or other reactions with reactive species present in the environment. In some cases, such reactions cause a deteriorative effect on $E_p$ (and consequently, the resultant $\Delta E_p$) over time, reducing efficiency, conversion rate and increasing power requirements of a system that includes the carbon substrate. Untreated $\Delta E_p$ may range from 75 mV to 870 mV, and may extend to values up to and including 1500 mV A process 160 for thermal treatment is included in FIG. 1, including individual steps for preparing and treating the graphitic carbon material 110. In some embodiments, the process 160 includes an initial step 161 of preparing the graphitic carbon material 110 for thermal treatment by modifying a surface of the graphitic carbon material to prepare it for thermal treatment. In some cases, preparing the graphitic carbon material 110 may include various techniques including, but not limited to, polishing a surface of the graphitic carbon material 110 (e.g., using a silicate polishing surface), mechanical exfoliation to isolate and/or remove one or more layers of graphitic carbon, forming the graphitic carbon material 110 on a substrate by thin-film deposition (e.g., chemical vapor deposition using a carbon precursor gas, spin coating, etc.), or the like. Alternatively, for example, when the graphitic carbon material 110 is prepared by depositing a carbon film on a substrate (e.g., using a suspension of graphitic carbon particles in a solvent), preparing the graphitic carbon material 110 may include curing, annealing, and/or removing the graphitic carbon material 110 from the substrate to a refractory holder.

The process 160 continues with step 163, wherein the graphitic carbon material 110 can be subjected to thermal treatment by first loading the graphitic carbon material 110 into a furnace and then subjecting the graphitic carbon material to a predefined heating schedule 120. As described in more detail in reference to FIG. 2, the furnace may include a heating zone and/or a heating cavity in which the furnace is configured to maintain a set temperature at a given time. The furnace may also include a treatment vessel and/or chamber, as described in more detail in reference to FIG. 2. For example, the graphitic carbon material 110 may be placed in a fused silica, quartz, and/or alumina tube configured to isolate the sample from the furnace and to provide a controlled atmosphere around the sample during thermal treatment.

The process 160 continues with step 165, wherein the graphitic carbon material 110 is thermally treated according to a heating schedule 120. The heating schedule 120 includes one or more temperature set points, including, but not limited to, a first temperature, a second temperature, a third temperature, one or more waiting periods, as well as one or more cooling steps. In step 165, the temperature in the heating zone is raised to the first temperature. In some embodiments, the first temperature falls within a temperature range between 600-700° C. In some embodiments, the first temperature includes, but is not limited to, a predetermined temperature between 600° C. and 700° C., or interpolations thereof. In some embodiments, the shape of the heating schedule 120 is pre-programmed to heat the furnace over a set period of time. In some embodiments, the furnace is not controlled in the heating to the first temperature, and the heating schedule 120 includes a step-change in a temperature set point. In some embodiments, the heating schedule 120 includes a third time period for reducing the temperature, such that a controller included in the furnace controls the heat supplied to reduce temperature overshoot and/or undershoot. For both heating and reduction periods, a heating profile in the heating schedule 120 may be linear (e.g., a ramp,) and/or may follow a heating schedule or profile determined by the controller and/or provided to the furnace.

The thermal treatment 165 may include maintaining the temperature inside the heating zone for a first period of time as part of the heating schedule 120. In some embodiments, the first time period over which the temperature inside the heating zone is maintained at the first temperature falls within a time range of about 20-30 minutes. The first time period may include, but is not limited to, 20 minutes, a predetermined time period between 20 and 30 minutes, or interpolations thereof. Subsequent to the first time period, the heating schedule 120 may include decreasing the temperature set point from the first temperature to a second temperature over a second time period. In some embodiments, the second temperature falls within a range of between about 450-550° C. In some embodiments, the second temperature includes, but is not limited to, a predetermined temperature between 450° C. and 550° C., or interpolations thereof. In some embodiments, the second time period falls within a range of 10-20 minutes. In some embodiments, the second time period includes, but is not limited to, a time period between 10 minutes and 20 minutes, or interpolations thereof. In some embodiments, the third temperature falls within a range of between about 180-270° C. In some embodiments, the third temperature includes, but is not limited to, a predetermined temperature between 180° C. and 270° C., or interpolations thereof. In some embodiments, the third time period (e.g., third duration) falls within a range of 10-20 minutes. In some embodiments, the third time period includes, but is not limited to, 10 minutes, 11, 12, 13, 14, 15, 16, 17, 18, 19, 20 minutes, a predetermined time period between 10 and 20 minutes, or interpolations thereof. The technique 100 may further include reducing the third temperature from the second temperature such that the furnace returns to an initial temperature of the onset of the heating schedule 120. In some embodiments, the furnace is not controlled when reducing the temperature to the first temperature, and the heating schedule 120 includes a step-change in a temperature set point. In some embodiments, the heating schedule 120 includes a fourth time period for reducing the temperature, such that the controller controls the heat supplied to reduce temperature overshoot and/or undershoot.

During treatment, the graphitic carbon material 110 may undergo changes that alter the covalent bonding arrangements of carbon atoms in each planar layer, thereby providing a treated graphitic carbon material 130. It is not the intent or purpose of the present application to assert a single physical phenomenon or a combination of physical phenomena responsible for properties described herein with reference to the treated graphitic carbon material 130. Instead, in some embodiments, the properties of treated graphitic carbon material 130 are observed following thermal treatment according to the heating schedule 120. In particular, treated graphitic carbon material 130 may include fewer or no defects 112*a-c* relative to those observed in the graphitic carbon material 110. Furthermore, the treated graphitic carbon material 130 may exhibit improved electronic properties 134 following thermal treatment including, but not limited to a reduced $\Delta E_p$ value by as much as 95% and/or within a range of 12-95% and an improved electron flux at the $E_p$ values as measured by current at $E_p$, and consequently a reduced $\Delta E_p$, which correlates to peak reaction rate in electrochemical reaction applications, power limits and sensitivity in sensor applications, etc., as described in more detail in reference to FIG. 4. Furthermore, the improved electronic properties 134, for example, as described by cyclic voltammetry, may include improved symmetry of the cyclic voltammogram, and thus improved electrochemical reversibility between anodic and cathodic operation modes of the treated graphitic carbon material 130.

In some embodiments, the process 160 continues with step 167 including incorporating the treated graphitic carbon material 130 into a system and/or device. In some embodiments, the system and/or device may be configured to implement an electrochemical application 140 (e.g., wastewater treatment, water purification/sterilization, sensing, etc.). In some embodiments, the electrochemical application 140 includes exposing the treated graphitic carbon material 130 to a liquid analyte, reaction medium, and/or solvent, as described in more detail in reference to FIG. 3. For example, the liquid solvent may include wastewater including one or more organic materials dissolved in the wastewater. In some embodiments, the treated graphitic carbon material 130 is configured to receive an electric bias relative to the liquid, such that free electrons may flow into or out of the treated graphitic carbon material 130, for example, in an electrochemical circuit (e.g., in battery systems and electric double layer capacitors) including a counter electrode and a power supply.

In some embodiments, the process 160 continues with step 169 may include continued, ongoing, and/or persistent use of the treated graphitic carbon material 130 in the electrochemical application 140. In some embodiments, the treated graphitic carbon material 130 is not used for the electrochemical application 140. Instead, the treated graphitic carbon material 130 may be aged in air and/or another controlled atmosphere for a period of time including, but not limited to, a range of one day to six months. Similarly, the treated graphitic carbon material 130, for example, as implemented in a system and/or device, may be exposed to the liquid analyte, reaction medium, and/or solvent as part of the electrochemical application 140 for a similar period of time, for example, one day to six months. During and/or after the period of time of aging and/or continued use in the electrochemical application 140, an aged graphitic carbon material 150 may be characterized by minimal change in the molecular structure, relative to the treated graphitic carbon material 130. Similarly, the aged graphitic carbon material 150 may exhibit stabilized electronic properties 154 characterized by an analogous minimal change relative to the improved electronic properties 134. In some embodiments, stabilized electronic properties 154 include an $\Delta E_p$ value that may differ from that of the improved electronic properties 134 by a range of 0% to 40%, for example, by increasing less than 35% relative to the $\Delta E_p$ value associated with the improved electronic properties 134. In some embodiments, the $\Delta E_p$ value may increase less than 5%, 10%, 15%, 20%, 30%, 40%, or interpolations thereof. In some embodiments, the $\Delta E_p$ value associated with stabilized electronic properties 154 may fall within a range of between 10%-85% of an analogous $\Delta E_p$ value associated with the electronic properties 114 of the graphitic carbon material 110. In such cases, the lower relative $\Delta E_p$ value indicates an improved suitability for applications as an electrode and/or sensor material including, but not limited to, the electrochemical application 140.

Figure 2:
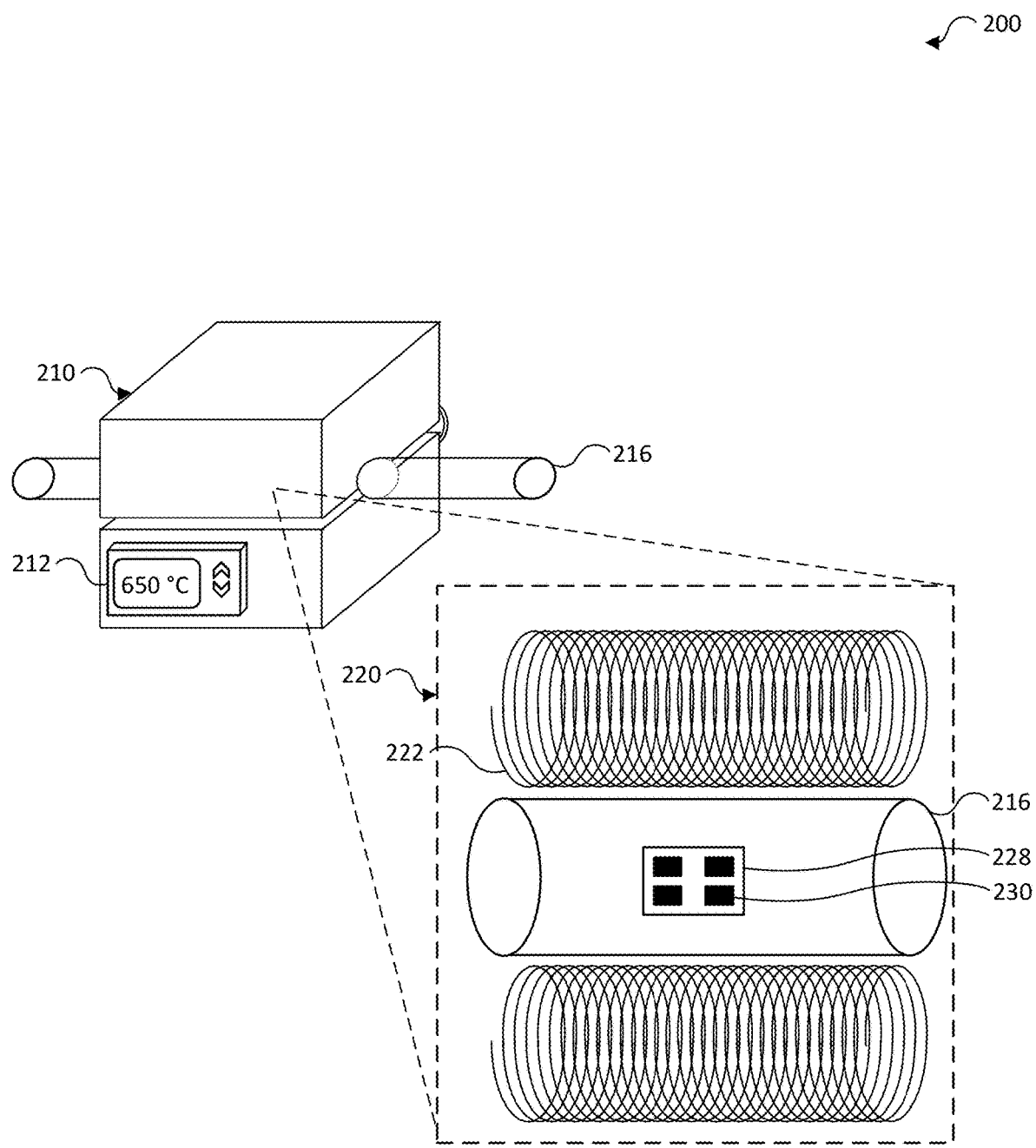
FIG. 2 is another diagram showing another example technique for improving and stabilizing an electronic property of graphite in accordance with an embodiment of the present disclosure.

FIG. 2 is another diagram showing a system 200 for improving and stabilizing an electronic property of graphite in accordance with an embodiment of the present disclosure. The process may include applying a thermal treatment schedule, as described in reference to FIG. 1, and may include preparatory treatments. As such, a heat source may be configured to heat the graphitic material in a controlled manner, with or without a controlled atmosphere. In some embodiments, as described in reference to FIG. 1, a heat source 210 including, but not limited to a tubular resistive furnace, may be configured to implement a heating schedule (e.g., heating schedule 120 of FIG. 1), for example, by pre-programming the heating schedule into an input/controller unit 212 included in the heat source 210. In some embodiments, the heat source may include a heating vessel 216 for isolating an interior heating zone 220 from the heat source 210. In some embodiments, the heating vessel 216 includes, but is not limited to, a glass tube, a fused-silica tube, an alumina tube, a quartz tube, a metal tube, additional shapes and morphologies in such materials (e.g., spherical, rectangular prism, etc.). In some embodiments, the heating vessel 216 includes fittings including gas and/or electrical feedthroughs for controlling the atmosphere inside the heating vessel 216. In some embodiments, the atmosphere inside the heating vessel 216 is air, such that the steps described in more detail in reference to FIG. 1 are implemented with air as a fill-gas.

In some embodiments, the heating vessel 216 is connected to a vacuum system configured to remove gas, such as air, from the heating vessel 216. In some embodiments, the interior heating zone 220 is located at a position of the heating vessel 216 in the heat source 210 where one or more graphitic carbon samples 230 (e.g., graphitic carbon material 110 of FIG. 1) may be placed, such that a temperature of the graphitic carbon samples 230 accurately reflects a temperature measured by the input/controller unit 212 during a thermal treatment (e.g., thermal treatment step 165 of FIG. 1). In some embodiments, the heat source may generate heat by one or more resistive coils 222. In some embodiments, the graphitic carbon samples 230 may be placed in a refractory holder to facilitate movement within the heating vessel 216.

Figure 3:
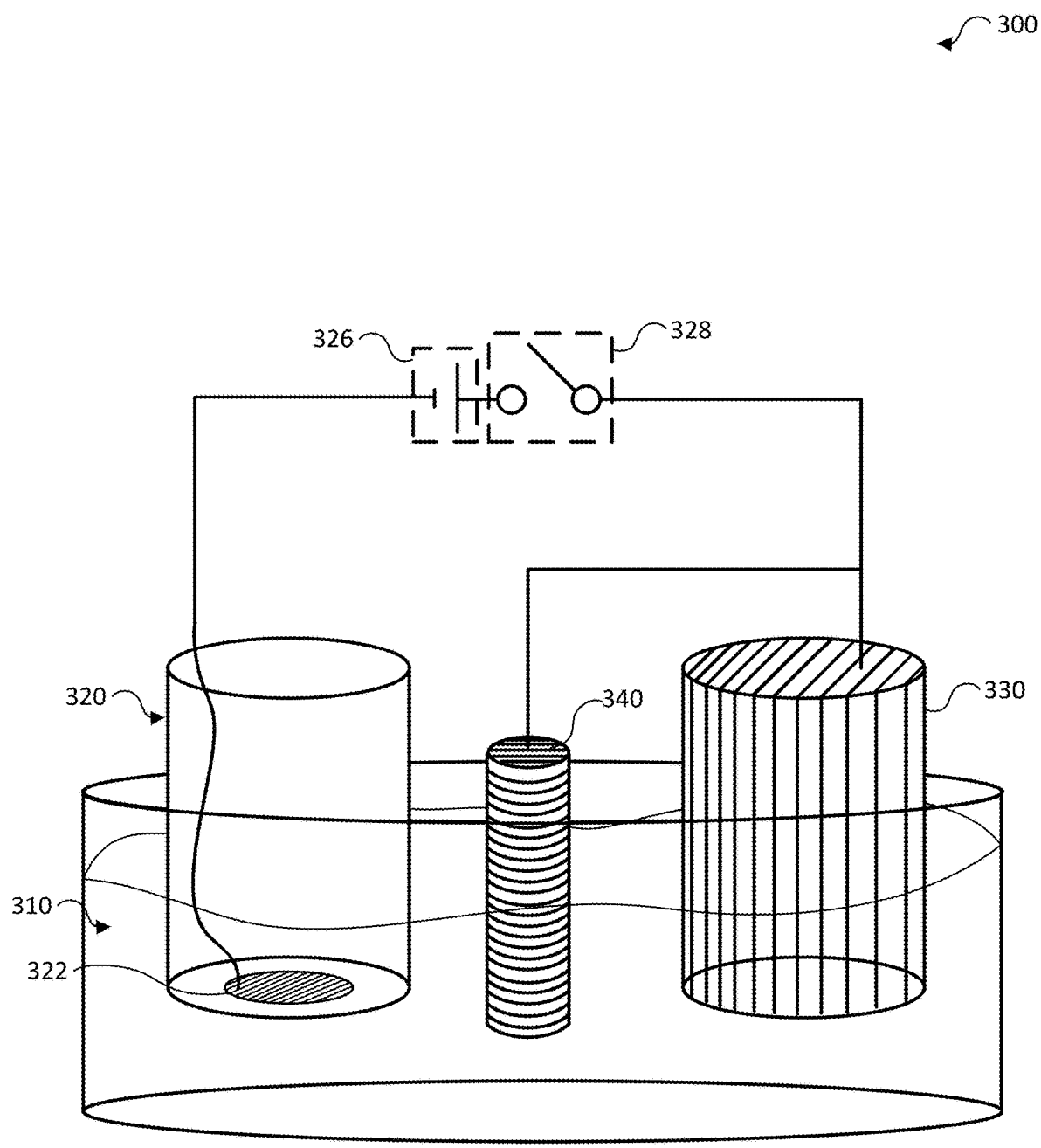
FIG. 3 is a diagram showing an example system incorporating a graphitic carbon electrode substrate having improved and stabilized electronic properties in accordance with an embodiment of the present disclosure.

FIG. 3 is a diagram showing an example system 300 incorporating a graphitic carbon electrode substrate having improved and stabilized electronic properties in accordance with an embodiment of the present disclosure. FIG. 3 describes a general electrochemical application as described in reference to process step 167 of FIG. 1, above. As such, multiple configurations are envisioned, including application of the graphitic carbon material as a cathode, as an anode, and in a variety of electrochemical reaction media. In some embodiments, as described in reference to FIG. 1, a graphitic carbon material 322 having improved electronic properties (e.g., treated graphitic carbon material 130 of FIG. 1) is incorporated into an electrical device 320 for use in applications involving chemical reactions in a liquid 310. In some embodiments, the liquid 310 may include, but is not limited to, wastewater, grey water, unfiltered water, water containing hydrocarbons, water containing organic chemicals, water containing one or more chemicals dissolved in the water (e.g., organic and inorganic solutes such as salts) that are susceptible to oxidation or reduction as a means of denaturation (e.g., electrochemical reduction), etc. In some embodiments, the electrical device 320 may be configured to electrochemically intercalate ions in the aqueous medium (e.g., as an electrode in lithium-ion batteries or similar devices).

In some embodiments, the electrical device 320 may include an electrode and/or a sensor at least partially enclosed in an electrically insulating housing, wherein the graphitic carbon material 322 may occupy a portion of the surface area of the electrical device 320 that is exposed (e.g., in direct contact) to the liquid 310, providing one or more conductive surfaces (e.g., a front surface, a back surface, etc.), as, for example, through a window in the electrically insulating housing. The graphitic carbon material 322 may be electrically coupled to the electrical device 320 via an electrically conductive contact that may be at least partially disposed within the electrically insulating housing (e.g., to potentially reduce short-circuit formation). In some embodiments, the electrical device 320 may be in electrical communication with one or more circuit elements, for example a power supply 326 and/or a controller unit 328. In some embodiments, the system 300 further includes a counter electrode 330 by which the electrochemical circuit is completed in the liquid 310. In some embodiments, for example, for sensor applications, the system 300 further includes a reference electrode 340. In some embodiments, the electrical device 320 may include the counter electrode 330, for example, by including multiple surfaces including multiple instances of the graphitic carbon material 322, being electrically insulated one from another within the electrical device 320. In some embodiments, the system 300 further includes liquid handling equipment (not shown) for exchanging the liquid 310 with fresh liquid or to maintain one or more chemical properties of the liquid 310 during application. In some embodiments, the system 300 further includes liquid or gas handling equipment (not shown) for investigating the chemical nature of the liquid 310 at the point of entry into the system and or exit from the system.

Figures 4A, 4B:
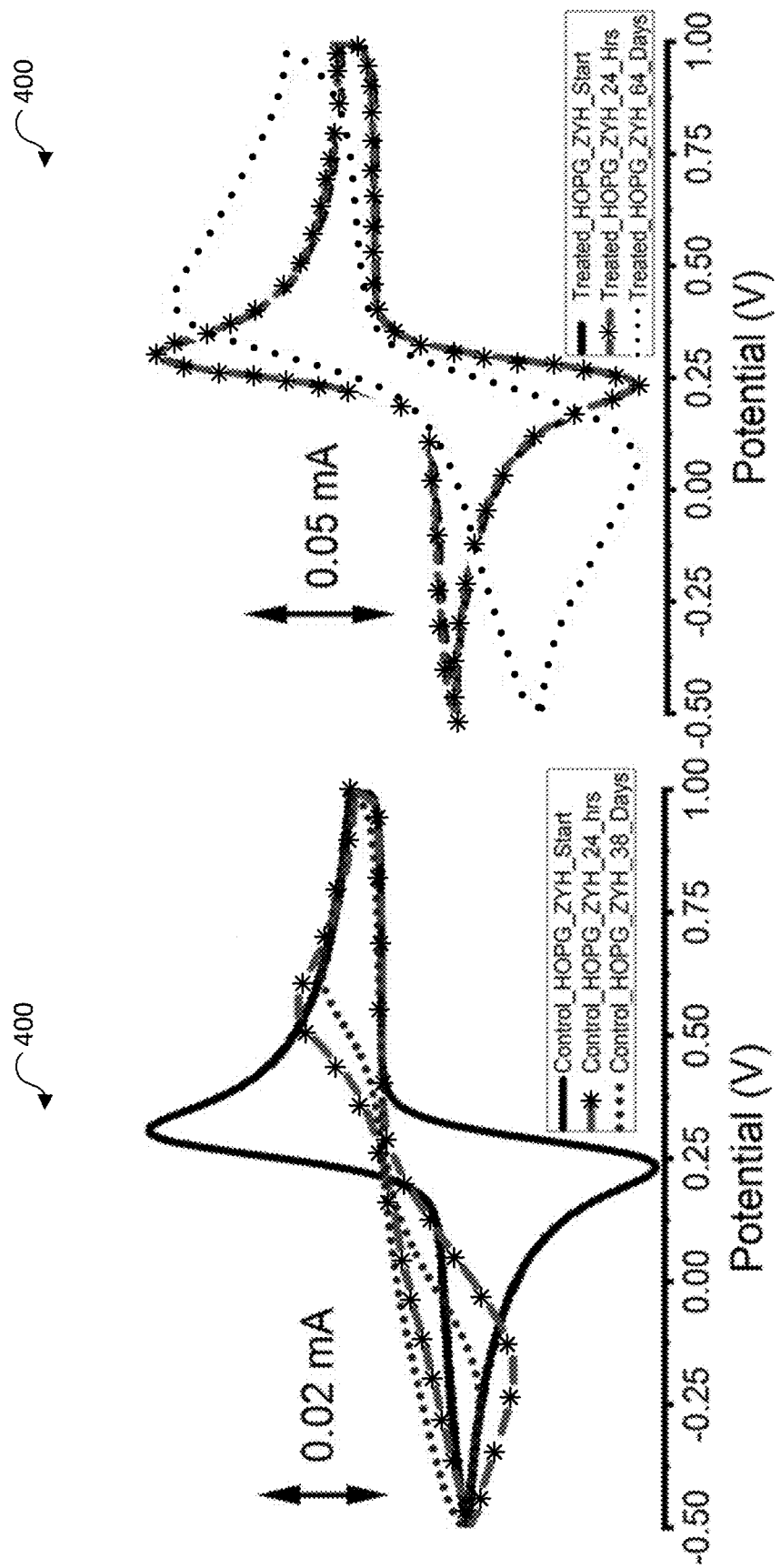
FIG. 4A is a diagram showing an example improvement in an electronic property of a graphitic carbon electrode substrate in accordance with an embodiment of the present disclosure.
FIG. 4B is an electron micrograph showing an example improvement in a material property of a graphitic carbon electrode substrate in accordance with an embodiment of the present disclosure.

FIG. 4A is a diagram showing an example of an electronic property of a graphitic carbon electrode substrate in accordance with an embodiment of the present disclosure. FIG. 4B is a diagram showing an example of an electronic property of a treated graphitic carbon electrode substrate in accordance with an embodiment of the present disclosure. As described in more detail in reference to FIG. 1, FIGS. 4A-4B present exemplary cyclic voltammetry measurements demonstrating the electrochemical behavior of graphitic carbon material before and after treatment. In some embodiments, as illustrated in FIG. 4A, an untreated graphitic carbon material (e.g., graphitic carbon material 110 of FIG. 1) may be characterized by cyclic voltammetry, as described in more detail in reference to FIG. 1, to provide an electronic property including, but not limited to an electrochemical peak potential ($E_p$) for both forward and reverse cycles. In some embodiments, an initial difference between the forward and reverse $E_p$ values ($\Delta E_p$) of the untreated graphitic carbon material may fall within a range of 69±3 mV/s. In some embodiments, after controlled aging in air, and/or after controlled aging in a liquid medium while acting as an electrode material, a first $\Delta E_p$ value of the untreated graphitic carbon material after 24 hours may fall within a range of 752±5 mV/s. In some embodiments, after a further 37 days, a second $\Delta E_p$ value for the same untreated graphitic carbon material may fall within a range of 863±5 mV/s. Concurrently, while the $\Delta E_p$ value increases over time, the current at peak potential decreases and measureable asymmetry is introduced into the cyclic voltammogram shown in FIG. 4A. In some embodiments, such an impact of aging over a one month period may preclude the use of the untreated graphitic carbon material in electrochemical applications as an electrode material exposed to the reaction liquid, for example, by limiting the electron flux through the electrode (e.g., electrical device 320 of FIG. 3) or the maximum potential at the surface of the electrode material, thereby limiting the energy available to drive reactions. By contrast, as illustrated in FIG. 4B, a treated graphitic carbon material (e.g., treated graphitic carbon material 130 of FIG. 1) may be characterized in a similar way, and may exhibit an initial $\Delta E_p$ value falling within a range of 66±2 mV/s, a first $\Delta E_p$ value falling within a range of 66±2 mV/s after one day, and a second $\Delta E_p$ value falling within a range of 323±20 mV/s after 64 days. As illustrated in FIG. 4B, the relatively lower values of $\Delta E_p$ after two months is accompanied by a limited reduction in peak current and persistent symmetry on both forward and reverse scans of the cyclic voltammogram, indicating limited impact of aging and/or use on effectiveness of the treated graphitic carbon material in electrochemical applications. Furthermore, in comparing FIG. 4A and FIG. 4B, thermal treatment (e.g., thermal treatment step 165 of FIG. 1) may provide improved stability of the $\Delta E_p$ value and improved current characteristics of the graphitic carbon material, even over a period longer than two months, longer than 12 months, and/or longer than 20 months (e.g., 24 months).

Figure 5:
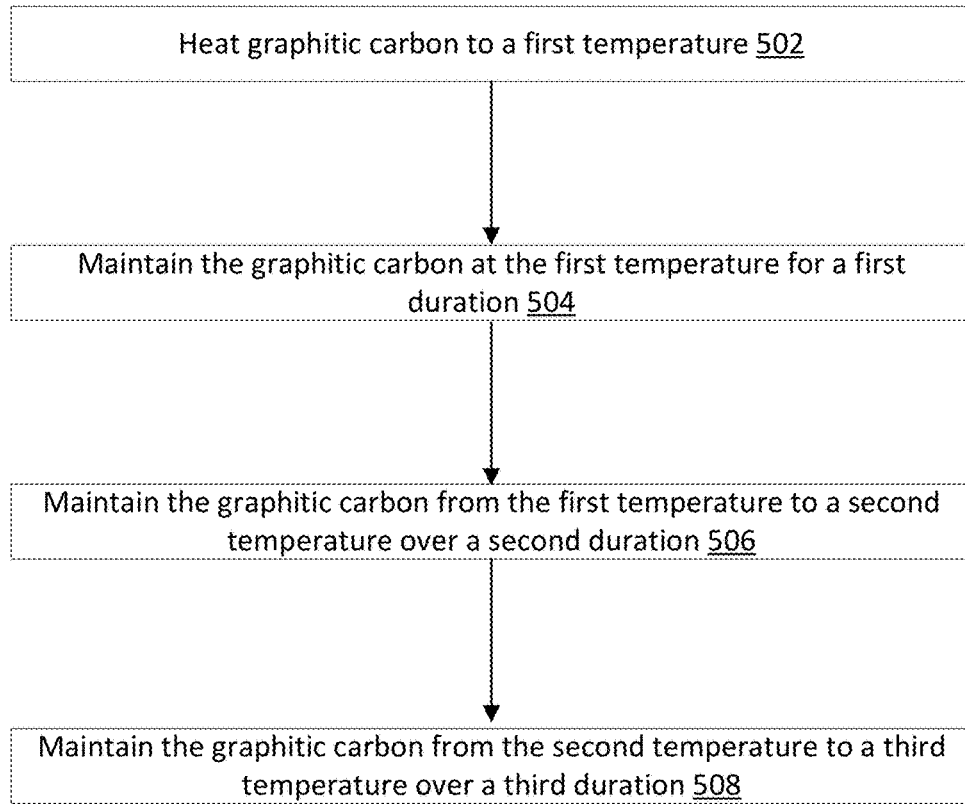
FIG. 5 is a simplified flowchart illustrating a method for improving and stabilizing an electronic property of graphite in accordance with an embodiment of the present disclosure.

FIG. 5 is a simplified flowchart illustrating a method for improving and stabilizing an electronic property of graphite in accordance with an embodiment of the present disclosure. It should be appreciated that the specific steps illustrated in FIG. 5 provide a particular method of thermal treatment of graphitic carbon materials (e.g., graphitic carbon material 110 of FIG. 1) according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

The method includes heating graphitic carbon to a first temperature (502). As described in more detail in reference to FIG. 1, the graphitic carbon may include a graphitic carbon substrate, a graphitic carbon material, a film, a foam, a felt, etc. Optionally, the graphitic electrode substrate comprises at least one of a highly-ordered pyrolytic graphite (HOPG), a graphite rod, a pyrolytic graphite, a graphite felt GFA3, a graphite felt GFA5, a natural graphite, graphene, or an artificial graphite. Optionally, the method includes preparing the graphitic carbon electrode substrate by at least one of: polishing the graphitic carbon, removing one or more surface layers by mechanical exfoliation, or depositing a film including the graphitic carbon on a substrate. In some embodiments, the first temperature is at least 600° C. Optionally, the first temperature may fall within the range described in FIG. 1, for example, between about 600-700° C. As described in more detail in reference to FIG. 2, heating may take place in a heat source, for example, a furnace, having a heating vessel or cavity, such that the graphitic carbon is heated in a controlled manner (e.g., heating schedule 120 of FIG. 1).

The method further includes maintaining the graphitic carbon substrate at the first temperature for a first duration (504). As described in more detail in reference to FIG. 1, in some embodiments, the first duration is at least about 20 minutes. Optionally, the first duration falls within a time range of about 20-30 minutes, during which time the graphitic carbon may be exposed to air.

The method further includes maintaining the graphitic carbon electrode substrate from the first temperature to a second temperature over a second duration (506). In some embodiments, the second duration is at least about 10 minutes. In some embodiments, the second temperature is at least about 450° C. Optionally, the second temperature falls within a temperature range between about 450-550° C. Optionally, the second duration falls within a time range of about 10-20 minutes.

The method further includes maintaining the graphitic carbon electrode substrate from the second temperature to a third temperature over a third duration (508). In some embodiments, the third duration is at least about 5 minutes. In some embodiments, the third temperature is at least about 180° C. Optionally, the third temperature falls within a temperature range between about 180-270° C. Optionally, the third duration falls within a time range of about 5-20 minutes. As described in more detail in reference to FIG. 1, the heating schedule (e.g., heating schedule 120 of FIG. 1) may include pre-programmed heating profiles to precisely control the temperature of the graphitic carbon and/or portions of the heating schedule may leave the heat source to operate without controlled heating.

Various computational methods discussed above may be performed in conjunction with or using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of skill in the art, such as the Oxford Dictionary of Biochemistry and Molecular Biology (Ed. Anthony Smith, Oxford University Press, Oxford, 2004).

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All references, including patent filings (including patents, patent applications, and patent publications), scientific journals, books, treatises, technical references, and other publications and materials discussed in this application, are incorporated herein by reference in their entirety for all purposes.

Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments.

Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the appended claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method for improving and stabilizing an electronic property of a graphitic material, the method comprising:
   heating a graphitic carbon electrode substrate in a heating cavity by applying heat within the heating cavity by a heat source to a first temperature of at least 600° C.;
   maintaining, via controlled heating by the heat source, the graphitic carbon electrode substrate at the first temperature for a first duration of at least 20 minutes;
   reducing a temperature of the graphitic carbon electrode substrate from the first temperature to a second temperature at a first cooling rate over a second duration of at least 10 minutes, wherein the second temperature falls within a second range of between 450-550° C.; and
   further reducing the temperature of the graphitic carbon electrode substrate from the second temperature to a third temperature at a second cooling rate greater than the first cooling rate over a third duration of at least 5 minutes, wherein the third temperature falls within a third range of between 180-270° C., generating a treated graphitic carbon electrode substrate.

2. The method of claim 1, further comprising preparing the graphitic carbon electrode substrate by at least one of:
   polishing the graphitic carbon electrode substrate using a silicate polishing surface;
   removing a graphitic layer from the graphitic carbon electrode substrate by mechanical exfoliation; or
   a thin-film deposition method comprising:
     depositing a graphitic carbon film onto a substrate using a suspension of graphitic carbon particles in a solvent or via chemical vapor deposition of a carbon precursor gas; and
     removing the graphitic carbon film from the substrate.

3. The method of claim 1, wherein the first temperature falls within a temperature range between 600-700° C.

4. The method of claim 1, wherein the second temperature falls within a temperature range between 450-500° C.

5. The method of claim 1, wherein the first duration is between 20-30 minutes.

6. The method of claim 1, wherein the second duration is between 10-20 minutes.

7. The method of claim 1, wherein the heating cavity comprises air as a fill-gas.

8. The method of claim 1, wherein the graphitic carbon electrode substrate comprises an electrically insulating substrate.

9. The method of claim 1, further comprising aging the treated graphitic carbon electrode substrate in air for a fourth duration, wherein the fourth duration exceeds 24 hours.

10. The method of claim 1, further comprising incorporating the treated graphitic carbon electrode substrate into an electrode device, the electrode device comprising one or more conductive surfaces constructed from the treated graphitic carbon electrode substrate, wherein:

the electrode device is configured to electrochemically reduce organic solutes in an aqueous medium or to electrochemically intercalate ions in the aqueous medium;

the one or more conductive surfaces are exposed at a surface of the electrode device such that, when the electrode device is immersed, the one or more conductive surfaces are positioned to come into direct contact with the aqueous medium during an electrochemical reduction process or an electrochemical oxidation reduction process.

11. The method of claim 1, wherein the third duration is between 5-20 minutes.

12. A method for improving and stabilizing an electronic property of a graphitic material, the method comprising:

heating a graphitic carbon electrode substrate in a heating cavity by applying heat within the heating cavity by a heat source to a first temperature of between 600-700° C.;

maintaining, via controlled heating by the heat source, the graphitic carbon electrode substrate at the first temperature for a first duration of between 20-30 minutes;

reducing a temperature of the graphitic carbon electrode substrate from the first temperature to a second temperature at a first cooling rate; and further reducing the temperature of the graphitic carbon electrode substrate from the second temperature to a third temperature at a second cooling rate greater than the first cooling rate, generating a treated graphitic carbon electrode substrate.

13. The method of claim 12, wherein the graphitic carbon electrode substrate comprises an electrically insulating substrate.

* * * * *

UNITED STATES PATENT AND TRADEMARK OFFICE
CERTIFICATE OF CORRECTION

| | |
|---|---|
| PATENT NO. | : 12,091,760 B2 |
| APPLICATION NO. | : 16/938695 |
| DATED | : September 17, 2024 |
| INVENTOR(S) | : Okechukwu Charles Nwamba |

It is certified that error appears in the above-identified patent and that said Letters Patent is hereby corrected as shown below:

On the Title Page

Item [73], correct the spelling of the Assignee's last name to --Nwamba--.

Signed and Sealed this
Twenty-ninth Day of October, 2024

*Katherine Kelly Vidal*

Katherine Kelly Vidal
*Director of the United States Patent and Trademark Office*